US011525748B2

(12) United States Patent
Battenberg (10) Patent No.: US 11,525,748 B2
(45) Date of Patent: Dec. 13, 2022

(54) METHOD FOR DETECTING A PARAMETER OF A CLOSURE ELEMENT

(71) Applicant: BATTENBERG ROBOTIC GMBH & CO. KG, Marburg (DE)

(72) Inventor: Günther Battenberg, Marburg (DE)

(73) Assignee: BATTENBERG ROBOTIC GMBH & CO. KG, Marburg (DE)

( * ) Notice: Subject to any disclaimer, the term of this patent is extended or adjusted under 35 U.S.C. 154(b) by 849 days.

(21) Appl. No.: 16/092,280

(22) PCT Filed: Apr. 5, 2017

(86) PCT No.: PCT/EP2017/058108
§ 371 (c)(1),
(2) Date: Oct. 9, 2018

(87) PCT Pub. No.: WO2017/174655
PCT Pub. Date: Oct. 12, 2017

(65) Prior Publication Data
US 2020/0355566 A1    Nov. 12, 2020

(30) Foreign Application Priority Data
Apr. 8, 2016    (DE) ..................... 10 2016 106 488.2

(51) Int. Cl.
*G01L 5/22*     (2006.01)
*B25J 9/00*     (2006.01)
(Continued)

(52) U.S. Cl.
CPC ............. *G01L 5/226* (2013.01); *B25J 9/0081* (2013.01); *B25J 9/042* (2013.01); *B25J 9/1633* (2013.01);
(Continued)

(58) Field of Classification Search
CPC .......... G05B 2219/40062; B25J 13/089; B25J 13/088; B25J 13/086
See application file for complete search history.

(56) References Cited

U.S. PATENT DOCUMENTS

| 4,988,260 A | 1/1991 | Kiba et al. |
| 5,627,767 A * | 5/1997 | Gabiniewicz ............. G01L 5/22 701/102 |

(Continued)

FOREIGN PATENT DOCUMENTS

| CN | 103670121 A | 3/2014 |
| CN | 105364934 A | 3/2016 |

(Continued)

OTHER PUBLICATIONS

Chinese Office Action, dated May 7, 2021, corresponding to Chinese Application No. 201780035561.7.
(Continued)

*Primary Examiner* — Raul J Rios Russo
*Assistant Examiner* — Carl F. R. Tchatchouang
(74) *Attorney, Agent, or Firm* — Ladas & Parry LLP; Malcolm J. MacDonald (57) ABSTRACT

A method for detecting at least one characteristic parameter of a closure element (12) closing an opening. By means of a handling device (10), a movement is imposed on the closure element (12), wherein at least the interacting force between the closure element and the handing device during the movement is determined by means of a first sensor (20) integrated in the handling device, and position changes of the closure element during the movement sequence are detected by means of a second sensor (26).

19 Claims, 5 Drawing Sheets

(51) Int. Cl.
  *B25J 9/04*    (2006.01)
  *B25J 9/16*    (2006.01)
  *B25J 13/08*   (2006.01)
  *B25J 15/00*   (2006.01)
  *B25J 19/02*   (2006.01)
  *G01B 11/26*   (2006.01)

(52) U.S. Cl.
  CPC ......... *B25J 13/085* (2013.01); *B25J 15/0019* (2013.01); *B25J 19/02* (2013.01); *G01B 11/26* (2013.01)

(56) References Cited

U.S. PATENT DOCUMENTS

| | | | |
|---|---|---|---|
| 6,062,079 A * | 5/2000 | Stewart | G01P 3/68 73/488 |
| 6,279,624 B1 | 8/2001 | Corfitsen | |
| 9,031,697 B2 | 5/2015 | Huang et al. | |
| 9,427,874 B1 * | 8/2016 | Rublee | B25J 11/0075 |
| 9,694,495 B1 * | 7/2017 | Edsinger | G05B 19/423 |
| 2007/0107193 A1 * | 5/2007 | Milojevic | B25J 11/00 29/559 |
| 2009/0069937 A1 * | 3/2009 | Battenberg | B25J 9/1694 700/254 |
| 2009/0204260 A1 | 8/2009 | Bryne et al. | |
| 2009/0293614 A1 * | 12/2009 | Deschutter | G01P 3/68 73/510 |
| 2016/0089789 A1 * | 3/2016 | Sato | B25J 13/085 700/254 |

FOREIGN PATENT DOCUMENTS

| | | |
|---|---|---|
| DE | 102007048530 A1 | 4/2009 |
| DE | 102014114277 A1 | 4/2016 |
| WO | 0040940 A1 | 7/2000 |
| WO | 2012125130 A1 | 9/2012 |

OTHER PUBLICATIONS

International Search Report, dated Jul. 17, 2017, corresponding to Application No. PCT/EP2017/058108.

Jens Vogelpohl, Thesis: "Entwicklung eines roboterbasierten Prufstands fur die Ermittlung der Langzeitbetriebsfestigkeit von beweglichen Karosserieteilen", Techische Universität Bergakademie Freiburg (2013).

* cited by examiner

METHOD FOR DETECTING A PARAMETER OF A CLOSURE ELEMENT

The application relates to a method for detecting at least one characteristic parameter, such as closing force, closing energy, or velocity response of a closure element closing an opening, particularly a door of a motor vehicle.

Especially in high-tech equipment, machinery, or vehicles, in which openings, such as doors, should be closed by closure elements, it is necessary that reproducible parameters can be detected that represent the closing or opening process.

Thus, there are mechanical testing systems to detect, for example, the closing movement of a motor vehicle door. A corresponding system with the designation EZSlam2 is sold by EZMetrology, US. In this case, the movement with a motor vehicle door is detected shortly before the closing process. There is no possibility to provide technical data related to the entire closing and opening process. The door velocity is detected according to the known measuring method by means of an optical sensor, which requires brackets, which are attached directly to the motor vehicle. The door movement itself is executed manually.

Furthermore, a testing system for testing vehicle doors is known from Kübrich Ingenieurgesellschaft mbH & Co. KG, Priesendorf, Germany. By means of the testing system, the dynamic opening and closing of the door and, at the same time, additional functions in the door as well, such as mirror, window lever, can be tested. During the test, fastening elements are connected to the door, which are firmly attached with a handling device, over the entire movement sequence of the door. To this end, suction cups in particular are used. For testing, the vehicle must be stationary and arranged in a fixed relationship with respect to the handling device.

The subject matter of WO 2012/125130 AJ is a drive device for a motor vehicle door. A force and position sensor is used for actuation.

To detect the position of a door, a noncontact sensor is used, according to WO 2006/035259, to enable automatic painting in the interior and on the exterior of a motor vehicle.

The object of the present invention is to detect the closing and opening movement of a closure element such that reproducible statements can be made regarding the movement sequence of the closure element and the essential parameters to this extent.

The object is essentially achieved in that the closure element is forced into a movement by means of a handling device, such as robots, particularly articulated robots, such that the force that is interactive upon the movement between the closure element and the handling device is detected by means of a first sensor integrated into the handling device. In doing so, one or more position changes of the closure element are detected during the movement sequence by means of a second sensor. Alternatively, position changes of the closure element are detected on the basis of a learned trajectory of the closure element. In doing so, a particular provision is that an element, such as a tool, extending from the handling device, is connected to the connecting element with non-positive locking, during an opening or closing process, in particular the opening process, for teaching the trajectory, that is the path of movement of the closure element, and the force application point and relative orientation of the element to the closure element remains unchanged during the opening or closing process.

According to the invention, there is a closure element test, supported by the handling device, with which the handling device defines a closure element and closes and/or opens in a reproducible manner in order to detect measurement variables simultaneously with intelligent sensors.

In doing so, it is not necessary to have a fixed connection between the door and the handling device. Instead, it is only necessary for the handling device to make contact with the closure element during the introduction of force. Thus, according to the invention, the interaction between the closure element and the handling device is suspended, at least before the closing process. The closure element moves without contact established with the handling device. By virtue of the fact that only one contact is necessary between the handling device and the closure element, without requiring attachment, the introduction of force can occur in desired areas of the closure element without having to consider the shape or designs of the closure element in the point of application, because the closure element does not have to be connected, by means of, for example, suction cups or other similarly functioning attachment elements, to the closure element during the introduction of force.

In doing so, a sensor integrated into the handling device—referred to hereinafter as a robot for the sake of simplicity—is used as a first sensor, which can be used to detect its moments of force or torques. A sensor to this effect is integrated into a robot arm or flange, by means of which forces are transferred to a closure element, such as a motor vehicle door, in the required scope. It is possible to close the closure element with defined acceleration and/or speed over a defined distance.

In doing so, it is particularly possible to select the distance, acceleration, and/or speed such that the robot and/or the element and/or component and/or tool extending from the robot and acting upon the closure element completely closes the closure element at slow speed or the closure element interactively moves over a distance with high acceleration, such that the closure element closes the opening without further action of the robot, e.g. locks itself. By means of the at least one first sensor available in the robot and/or on the flange, it is possible to detect the forces and torques occurring during the movement in real time.

Thus, the forces measured over the distances traveled can be integrated by means of real-time movement such that the action actually performed can be detected along the executed movement. Thus, it is possible to allow closing of the closure element by means of the robot with a predefined closing energy and/or, for example, to allow a motor vehicle door to lock itself.

In doing so, the closure element is moved by the robot until the integrated action has achieved the preset energy threshold. Subsequently, the movement of the robot is interrupted so that the closure element can close the opening itself with sufficient acceleration, that is the door locks itself in the case of a motor vehicle.

The invention is thus characterized in that the interaction between the closure element and the handling device is suspended, that is interrupted, before the closing process.

In particular, a part of the movement sequence or the entire movement sequence of the closure element is determined, by means of the second sensor, both during and after the force acting on the closure element by means of the handling device.

In a further development of the invention, an idle state, such as the closing state of the closure element, is determined by means of the second sensor.

As the second sensor, particularly a noncontact sensor, such as a laser line sensor, is used, by means of which the progression of the closure element is determined during its movement.

In particular, the closure element is pivoted around an axis, which extends from a component, which is arranged in a fixed position with respect to the second sensor, during opening and/or closing. In this process, during the closing and/or opening of the closure element, the angle thereof to the component is determined by means of the second sensor.

Consequently, the angle, which is formed between the closure element and the fixed component, is measured during the movement of the closure element by means of the second sensor.

To this end, where a laser line sensor is used as the second sensor, it is positioned such that a section of the laser line detects the fixed component in relation to the second sensor and the remaining section detects the closure element.

In the case of a motor vehicle, the laser line is oriented such that one section covers the body, such as the fenders, as the fixed component and the remaining section covers the door. When the door is closed, a continuous line profile is obtained—optionally with consideration of a door gap. When the door is not closed, the sections of the straight lines of the laser line form an angle, which directly correlates to the door opening angle. In this process, during the closing and/or opening of the closure element, the angle thereof to the component is determined by means of the second sensor. Consequently, the angle, which is formed between the closure element and the fixed component, is measured during the movement of the closure element by means of the sensor.

Thus, with a high sampling rate, the chronological progression of the sections moving with respect to one another or pitch lines of the laser line are measured in order to detect the door opening angle over time. The angle speed of the door, as a function of time, can be determined, by means of differentiation, from the measured, chronological progression of the change of the door angle.

Thus, it is possible to detect the closing and/or opening speed over the entire movement path.

A further advantage with the use of a laser line sensor is that the measurement can occur without contact, so that, deviating from the prior art, no object, such as a bracket, must be attached to the door or doorframe or to another component.

It is furthermore crucial that the movement is executed by the robot in a defined and reproducible manner. As previously mentioned, according to the prior art, people slam the doors, whereby a significant potential for errors is generated.

The invention is particularly thus characterized in that the entire or virtually the entire movement sequence of the closure element is detected by means of the first sensor and/or the second sensor.

In particular, the teaching according to the invention can be applied to the closing and/or opening characteristics of a motor vehicle door. In doing so, it is also possible for a measurement to occur during the movement of the motor vehicle, that is during production or when the motor vehicles or the body is being carried on a driverless transport system. To this end, the invention proposes that the robot be moved synchronously along with the movement of the motor vehicle.

In a further development of the invention, it is proposed that the position of the closure element be determined and that the handling device interact with the closure element as a function of the determined position. In doing so, the handling device acts upon the closure element in the same or virtually the same area, regardless of the position of the closure element.

Furthermore, it is particularly proposed that the relative orientation between the closure element and the handling device and/or the element and/or component extending from the handling device and connected to the closure element always be the same in the point of application, that is in the active area or point, namely independent of the position of the closure element.

Preferably, the invention stipulates that the area of the closure element interacting with the handling device is defined by a marking on the closure element, that coordinates of the marking are determined by means of sensors, and that the handling device interacts with the marking or another equivalent area and thus with the closure element in the necessary scope, independently of the position of the closure element.

In particular, the invention stipulates that the respective position coordinates of the marking are determined in at least three different positions of the closure element and that the movement path of the closure element is calculated from the position coordinates determined in the at least three positions. In doing so, the coordinates are calculated by means of sensors in coordinates of the coordinate system of the handling device.

In order to achieve a desired reproducibility of the measurement results, the invention is particularly characterized in that the working direction of the force from the handling device acting upon the marking is the same, regardless of the position of the closure element. To this end, a surface of the closure element in which, for example, the marking is located or which is spanned by the marking, is determined particularly with optical sensors in order to then determine a direction, which corresponds to the working direction of the force acting upon the marking, by means of a measuring beam. The coordinates determined in this manner in the coordinate system of the robot and the known progression of the closing movement of the closure element ensure that the force is introduced in the same area of the closure element, at which the real or a virtual marking is located, regardless of the position of the closure element, wherein the working direction is always the same, that is the vector has the same direction with reference to the marking.

To ensure that the closure element is not damaged during the interaction between the robot and/or the component extending therefrom, which acts upon the closure element, and the closure element, the handling device and/or the component is particularly supported so to slide on the closure element. A wheel or a roller can be provided for this.

Based on the teaching according to the invention, the following methods, in particular, can be implemented:

It is possible to reproducibly measure the force-displacement path or force-closure angle characteristic curve upon slow actuation of the closure element over the complete actuation path by the handling device. In doing so, it is also possible to determine the characteristic curves upon opening of the closure element. To this end, the closure element can be rigidly coupled with the handling device by means of a tool, e.g. using a suction device, such that, as a result, the characteristic curves can be measured both during closing and during opening of the closure element. Tests related to this are of interest to laboratories.

It is possible to reproducibly test whether a closure element shuts or locks itself or not with a determined, predefined closing energy, acceleration, or speed, which is introduced by the handling device. A test related to this is of particular interest to production.

It is possible to slam a closure element with defined closing energy, acceleration, or speed while simultaneously measuring the speed/closure element angle characteristic curve by means of the second sensor, particularly a noncontact sensor such as a laser line sensor. By means of iterative tests, it can further be determined how much the minimum closing energy must be so that the closure element closes and/or securely locks itself. As an alternative, it is also possible to determine the minimum speed of the closure element so that the closure element securely closes and/or securely locks itself. Tests related to this are particularly of interest to laboratories.

It is possible to determine whether the closure element is properly aligned with respect to the opening to be closed. If the alignment is faulty, this will result in closing forces that are outside of the given values. Measurements related to this are particularly of interest to production.

If measurements are carried out in production equipment for motor vehicles, the precise position of the vehicle to be measured is determined by means of suitable sensors such as, for example, by cameras or laser sensors. The closing movement of the door, that is the action of the robot, is then adapted to the position of the motor vehicle.

Particularly for laboratory applications, it is possible, as previously mentioned, to ensure, with a simple process, that reproducible closing movements of a closure element, in particular the closing movement of a motor vehicle door, are detected and the relevant parameters are determined, without having to precisely determine the position of the vehicle. To this end, the point of application for the robot is specified virtually or by using a marking and/or a marker on the door, which is detected by sensors in order to then directly determine the coordinates of the marking in the robot coordinate system with the assistance of controlled robot movements. This is carried out for at least three different door opening angles in order to determine the path trajectory for the robot for closing the door directly and automatically.

One independent proposal to achieve the object is a method for detecting at least one characteristic parameter, such as closing force or closing energy or speed characteristic, of a closure element closing an opening, particularly the door of a motor vehicle, which is characterized in that a movement is forced upon the closure element by means of a handling device and that at least the force interacting between the closure element and the handling device upon the movement is determined by means of a first sensor integrated in the handling device, wherein the working direction of the force acting on the closure element by the handling device is the same, regardless of the position of the closure element.

The invention is also characterized by a method for detecting at least one characteristic parameter, such as closing force or closing energy or speed characteristic, of a closure element closing an opening, particularly the door of a motor vehicle, which is characterized in that a movement is forced upon the closure element by means of a handling device, that at least the force interacting between the closure element and the handling device upon the movement is determined by means of a first sensor integrated in the handling device, and that the working interaction between the closure element and the handling device is suspended.

Further details, advantages, and features of the invention result not only from the claims, the features to be taken from said claims—on their own and/or in combination—as well as the preferred exemplary embodiments to be obtained from the following description of the drawing.

The following is shown.

According to the invention, robot-supported testing of motor vehicle doors by means of a handling device—hereinafter referred to as a robot—is explained without limiting the teaching according to the invention by the motor vehicle door application example. Instead, the invention applies to any closure elements.

An articulated robot is particularly used as the handling device.

Figure 1:
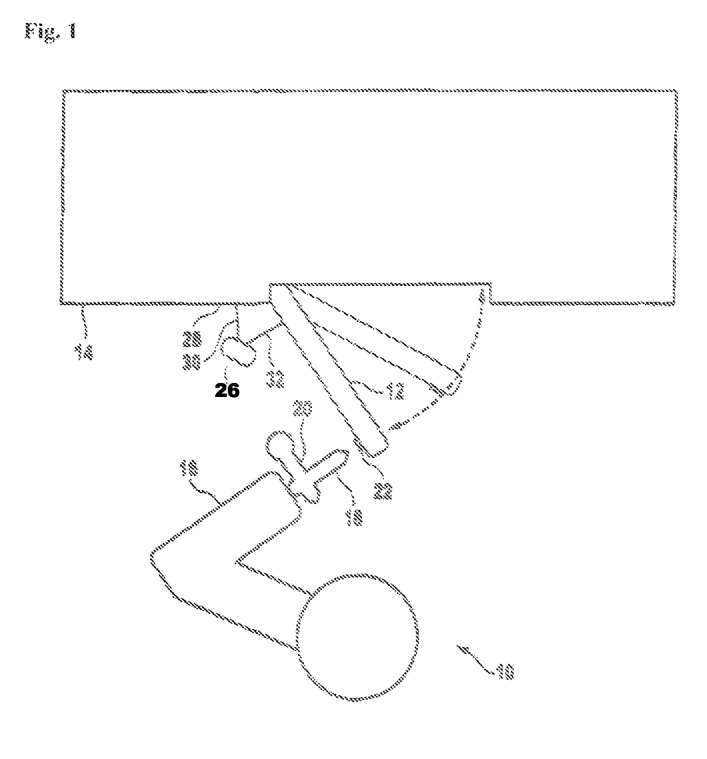
FIG. 1 shows a schematic representation of a vehicle as well as a robot, which introduces forces upon a door to be closed.

By means of a robot 10, a door 12 of a motor vehicle 14 is defined and reproducibly closed in order to then detect various measurement variables with the assistance of intelligent sensors.

The robot 10 has an element and/or components, such as a tool 18, on an arm 16, such that forces are introduced upon the door 12 in order to move it and particularly let it snap shut with a lock of the motor vehicle 14. Predefined closing energies, accelerations, or speeds can hereby be provided or generated.

In order to determine the force, the robot 10 has a corresponding moment of force or torque sensor 20, as is part of the prior art. In doing so, according to the invention, the tool 18 always interacts at the same point 22 with the door 12, regardless of the position of the door 12, wherein the working direction of the force to be introduced is also the same, regardless of the position of the door 12. To this end, a point of application 22 is specified, e.g. by a marking. The point of application 22 is detected and its coordinates are determined in the coordinates of the coordinate system of the robot 10.

Figure 2:
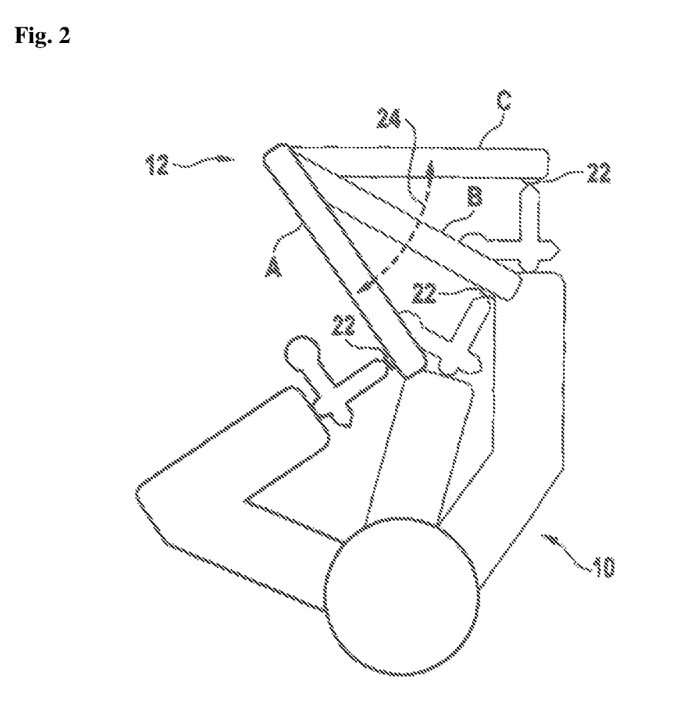
FIG. 2 shows a schematic representation of a robot interacting with a motor vehicle door in various positions.

As shown in FIG. 2, the coordinates of the marking 22 are determined in three positions, A, B, C, of the door 12, in order to determine the path movement 24 to achieve reproducible results.

To this end, the marking 22 can be detected by optical sensors, and a measuring beam, which coincides with the working direction of the force to be introduced, can be aligned to the plane spanned by the marking. This enables a clear position determination of the marking 22, regardless of the opening angle of the door 12. The coordinates of the working point, upon which the handling device acts, are determined from three positions. Thus, the movement path of the working point and thus that of the door 12 can be calculated. During the interaction of the robot 10 with the door 12, the robot 10 acts upon the door 12 in the same or virtually the same area.

The working point can coincide with the marking 22, wherein the marking 22 does not necessarily have to be an optically detectable mark attached, such as bonded, to the door 12. Instead, the marking can also be an individualized area of the door 12, such as the lock opening, or an optically detectable element, such as a sensor, integrated into the door 12.

Figure 4:
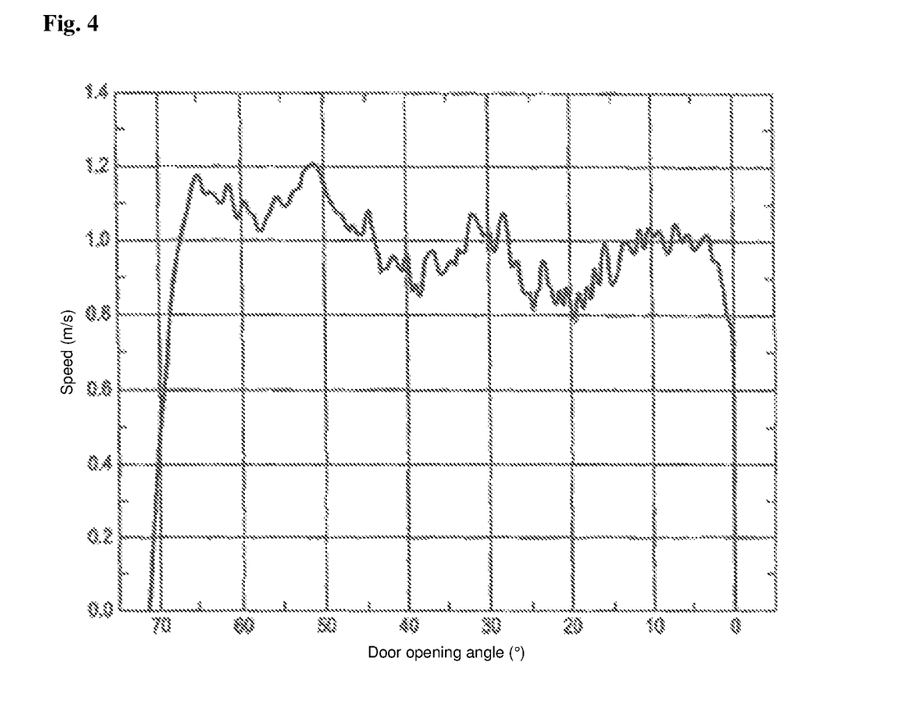
FIG. 4 shows a speed/door-angle characteristic curve in a motor vehicle door to be closed.

In order to determine the opening angle of the door 12, there is a second sensor, according to FIG. 1, in the form of a laser line sensor 26, by means of which the course of the door angle is measured during the door movement. To this end, the laser line sensor 26 is positioned such that a part and/or section of the laser line strikes a stationary area of the motor vehicle 14, i.e. the body such as the fenders 28, and the remaining area and/or remaining part of the beam detects the door 12. These are sections 30 and 32 in the exemplary embodiment. When the door 12 is closed, a consistent line profile would thus be determined with consideration of a door gap. When the door 12 is open, the subsections of the straight lines 30, 32 of the profile form an angle, which directly correlates to the door opening angle. If the chronological progressions of the sections 30, 32, i.e. of pitch lines, are measured with a high sampling rate, the door opening angle can be recorded over time. The door 12 can be determined as a function of time from the measured characteristic of the door opening angle over time through differentiation, as shown in FIG. 4. Thus, as shown also in FIG. 4, the door speed can be detected over the entire movement sequence.

This is implemented by measuring with contact such that measurement distortions are excluded. Furthermore, the movement is defined and reproducible by the robot 10.

Figure 5:
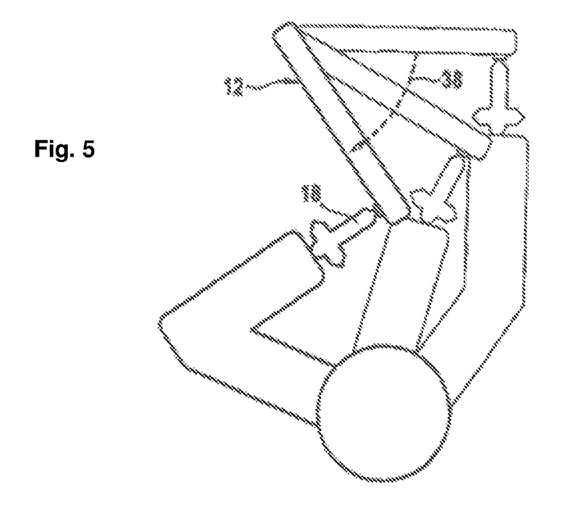
FIGS. 5, 6 show movement sequences.

However, the opening angle of the door 12 can thereby also be determined in that the trajectory, that is the movement path of the door, is previously learned. This is shown in FIG. 5. Thus, for example, the robot and/or the tool 18 extending therefrom remain connected to the door 12 during opening. This can be done, for example, using suction cups. The door 12 is then hoisted, controlled by sensors. The point of application and relative orientation of the tool 18 to the surface of the door 12 remain unchanged. The trajectory determined in this manner then enables the opening angle to be determined.

Figure 6:
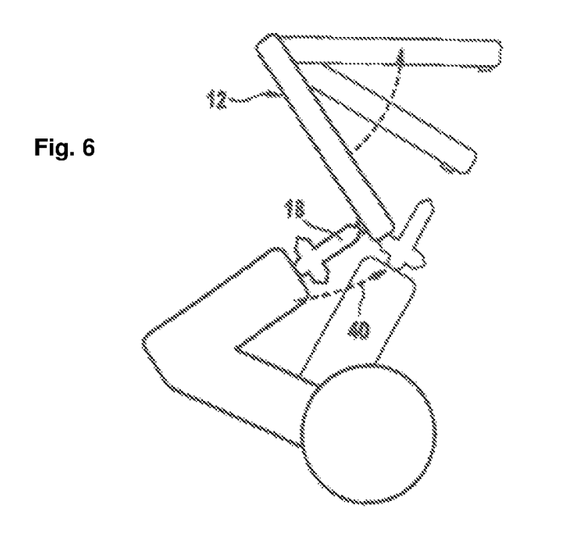

FIG. 6 again shows that the tool introduces the closing movement of the door 12 onto the door 12 with the same orientation in the same point of application. In the exemplary embodiment, the tool moves along a section 40 of the learned trajectory 38. At the end of the section 14, the contact between the door 12 and the tool 18 is suspended such that characteristic data of the door 12 regarding, for example, the closing capacity and/or speed and/or acceleration or closing energy, are determined as a function of the forces and/or energies introduced via the tool 18.

Figure 3:
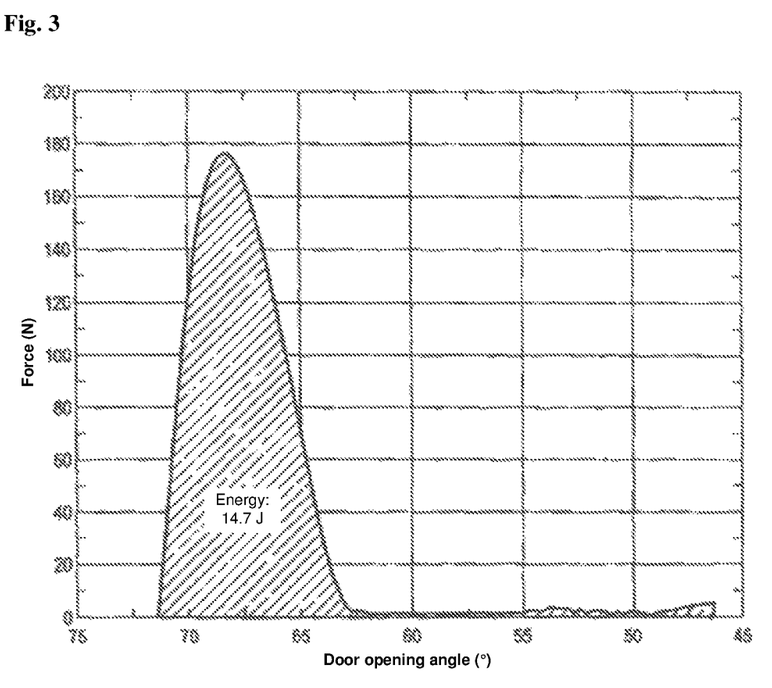
FIG. 3 shows a force/door-angle characteristic curve in a door to be closed.

FIG. 3 shows that the closing energy can be determined, which is required so that the door 12 locks itself. In order to determine the precise energy, iterative tests are conducted in order to detect the minimum closing energy, i.e. the energy which is required, so that the door 12 also securely locks itself. To do this, it is only necessary that the force introduced into the door 12 be integrated over the distance traveled in order to obtain a statement on the currently performed action and thus the energy provided along the door movement. The robot 10 moves the door 12 until the integrated action has reached a given energy threshold. The robot 10 is then halted in its movement such that the door 12 implements the closing movement without the additional introduction of force. Thus, it can be determined, through successive changing of the supplied energy, when the door 12 also snaps securely shut with the lock of the vehicle 14.

By means of the second sensor 26, it is also possible to determine the post-oscillation times of a door 12. This provides conclusions on the fitting accuracy of the door 12.

In addition, the gap dimension between the door 12 and the body can be determined. To this end, an optical sensor can be used, which is integrated into the robot 10.

In particular, the gap dimension at the door 12 can be detected via the line sensor 26.

The line sensor 26 can also be used to detect the state of closure of the door.

It is also possible to supply information to the control of the robot 10 as to which door 12 [and] which motor vehicle type is to be tested, wherein a virtual marking, upon which the robot 10 is to introduce forces, can also be given.

To ensure that during interaction between the robot 10 and the door 12 the latter is not damaged, a particular provision is that the robot 10 or the element interacting with the door 12 and extending from the robot 10 acts upon the door 12 in a gliding manner. A roller or a wheel can be provided for this.

The invention claimed is:

1. A method for detecting a parameter of a closure element closing an opening of a fixed component, the method comprising:
    forcing a movement upon the closure element using an articulated-arm robot, in the absence of a fixed connection between the closure element and the articulated-arm robot;
    determining a force, introduced by the articulated-arm robot upon the closure element during the movement upon the closure element, using a first sensor integrated in the articulated-arm robot;
    detecting positional changes of the closure element during the movement using a second sensor;
    measuring the force and a torque occurring during the movement between the closure element and the articulated-arm robot in real time using the first sensor;
    wherein an energy is introduced on the closure element by the articulated-arm robot,
    wherein a movement of the articulated-arm robot is interrupted when a predefined energy threshold is reached, so that the closure element has a sufficient acceleration to close the opening by itself;
    wherein a working direction of the force from the articulated-arm robot acting on the closure element is identical, regardless of the position of the closure element; and
    measuring a progression of an angle between the closure element and a component arranged stationary relative to the second sensor using a noncontact sensor in a form of a laser line sensor emitting a laser line, wherein a section of the laser line covers the fixed component and a remaining section of the laser line covers the closure element; or
    detecting positional changes of the closure element based on a taught movement path of the closure element.

2. The method according to claim 1, wherein a part of the movement sequence, or the entire movement sequence, of the closure element is determined by means of the second sensor, both during and after the force acting on the closure element by means of the articulated-arm robot.

3. The method according to claim 1, wherein an idle state of the closure element is determined by means of the second sensor.

4. The method according to claim 1, wherein the entire movement sequence of the closure element is determined by means of at least one of the first sensor and the second sensor.

5. The method according to claim 1, wherein a moment of force, or torque sensor, is used as the first sensor and/or a noncontact sensor is used as the second sensor.

6. The method according to claim 1, wherein the closure element is pivoted, during opening and closing, around an axis, which extends from an element, which is arranged stationary to the second sensor, wherein, during the closing and/or opening of the closure element, its angle to the element is measured by means of the second sensor.

7. The method according to claim 1, wherein the closure element is a door of a motor vehicle, which is moved during the detection of the parameter, wherein the articulated-arm robot is moved synchronously with the motor vehicle during detection of the parameter.

8. The method according to claim 1, wherein the articulated-arm robot interacts with the closure element by means of a sliding element.

9. The method according to claim 1, wherein the articulated-arm robot acts upon the same, or virtually the same, area of the closure element, regardless of the position of the closure element.

10. The method according to claim 1, wherein an area of the closure element interacting with the articulated-arm robot is given by a marking on the closure element, the coordinates of which are determined by means of sensors in the coordinates of the coordinate system of the articulated-arm robot.

11. The method according to claim 10, wherein coordinates of the marking are determined in at least three different positions of the closure element, and the movement path of the closure element is calculated from the at least three positions.

12. The method according to claim 1, wherein the working direction of the force from the articulated-arm robot acting upon the closure element is the same regardless of the position of the closure element.

13. The method according to claim 1, wherein the interaction between the closure element and the articulated-arm robot is suspended before a closing process of the closure element is finished.

14. The method according to claim 1, wherein, in order to teach a trajectory, an element extending from the articulated-arm robot is connected to the closure element with non-positive locking during an opening or closing process, and the point of force application and relative orientation to the closure element remain unchanged during the opening or closing process.

15. The method according to claim 1, wherein the parameter of the closure element is a member selected from the group consisting of closing force, closing energy, and speed.

16. The method according to claim 3, wherein the idle state is a closed state.

17. The method according to claim 8, wherein the sliding element is a roller or a wheel.

18. The method according to claim 10 wherein the working direction of the force from the articulated-arm robot acting on the marking is the same regardless of the position of the marking element.

19. The method according to claim 1, wherein an angle between the laser line sections that cover the fixed component and the closure element is equal to the angle between the closure element and the fixed component.

* * * * *